(12) United States Patent
Frenz

(10) Patent No.: US 9,501,375 B2
(45) Date of Patent: Nov. 22, 2016

(54) MOBILE APPLICATION TOOL AND GRAPHICAL USER INTERFACE

(71) Applicant: MTS Systems Corporation, Eden Prairie, MN (US)

(72) Inventor: Andrew Frenz, Minneapolis, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 198 days.

(21) Appl. No.: 13/762,289

(22) Filed: Feb. 7, 2013

(65) Prior Publication Data

US 2013/0212512 A1    Aug. 15, 2013

Related U.S. Application Data

(60) Provisional application No. 61/596,144, filed on Feb. 7, 2012.

(51) Int. Cl.
| | | |
|---|---|---|
| *G06F 3/048* | (2013.01) | |
| *G06F 11/22* | (2006.01) | |
| *H04L 29/08* | (2006.01) | |
| *G06F 3/0482* | (2013.01) | |

(52) U.S. Cl.
CPC ......... *G06F 11/2294* (2013.01); *G06F 3/0482* (2013.01); *H04L 67/06* (2013.01)

(58) Field of Classification Search
CPC ................................................ G06F 19/3406
USPC ................................................ 715/734, 736
See application file for complete search history.

(56) References Cited

U.S. PATENT DOCUMENTS

| | | |
|---|---|---|
| 6,351,223 B1 | 2/2002 | DeWeerd et al. |
| RE38,985 E | 2/2006 | Boatman et al. |
| 8,788,885 B1 | 7/2014 | Cook et al. |
| 8,839,035 B1 * | 9/2014 | Dimitrovich et al. .......... 714/25 |
| 9,015,612 B2 * | 4/2015 | Nguyen et al. ............... 715/769 |
| 2003/0014505 A1 | 1/2003 | Ramberg |
| 2004/0073654 A1 | 4/2004 | Sarma |

(Continued)

FOREIGN PATENT DOCUMENTS

| | | |
|---|---|---|
| EP | 0410932 A2 | 1/1991 |
| WO | 0045265 A1 | 8/2000 |
| WO | 2004029808 A2 | 4/2004 |

OTHER PUBLICATIONS

International Search Report and Written Opinion from the European Patent Office for International Application No. PCT/US2013/025212, filed Feb. 7, 2013.

(Continued)

*Primary Examiner* — Omar Abdul-Ali
(74) *Attorney, Agent, or Firm* — Steven M. Koehler; Westman, Champlin & Koehler, P.A.

(57) ABSTRACT

A mobile application tool is disclosed to provide remote access to data, and in particular test data. In embodiments disclosed, the mobile application tool includes a mobile test interface component configured to receive an access input associated with one or more testing devices and invoke an interface to a remote test platform to retrieve one or more testing device selections for the one or more testing devices associated with the access input. The tool includes a display function configured to receive the one or more testing device selections and invoke a graphical user interface to display the one or more test device selections and data associated with the one or more test device selections.

19 Claims, 14 Drawing Sheets

(56) References Cited

U.S. PATENT DOCUMENTS

| | | | |
|---|---|---|---|
| 2005/0034029 A1* | 2/2005 | Ramberg et al. | 714/43 |
| 2008/0077260 A1 | 3/2008 | Porter et al. | |
| 2009/0259321 A1* | 10/2009 | Stellari et al. | 700/9 |
| 2009/0295918 A1* | 12/2009 | Horovitz et al. | 348/143 |
| 2010/0083048 A1 | 4/2010 | Calinoiu | |
| 2010/0131927 A1 | 5/2010 | Pinjala | |
| 2010/0275061 A1 | 10/2010 | Lee | |
| 2011/0035063 A1 | 2/2011 | Palayur | |
| 2011/0138310 A1* | 6/2011 | Gomez et al. | 715/769 |
| 2011/0270626 A1 | 11/2011 | Romans | |
| 2012/0029947 A1 | 2/2012 | Wooldridge et al. | |
| 2012/0053778 A1 | 3/2012 | Colvin et al. | |
| 2012/0198279 A1 | 8/2012 | Schroeder | |
| 2012/0259575 A1 | 10/2012 | Graas et al. | |
| 2013/0212149 A1 | 8/2013 | Frenz | |
| 2013/0212512 A1 | 8/2013 | Frenz | |
| 2013/0219218 A1 | 8/2013 | Frenz | |

OTHER PUBLICATIONS

Readme File TestWatch Application Release 1.3g, Copyright 1994-2004, MTS Systems Corporation.
Office Action for U.S. Appl. No. 13/762,282, filed Feb. 7, 2013, mailed May 19, 2015.
Office Action for U.S. Appl. No. 13/762,299, filed Feb. 7, 2013, mailed May 18, 2015.
Office Action for U.S. Appl. No. 13/762,289 mailed Aug. 3, 2015.
Office Action for U.S. Appl. No. 13/762,299 mailed Jan. 28, 2016.
Office Action for U.S. Appl. No. 13/762,282 mailed Feb. 25, 2016.
Office Action for U.S. Appl. No. 14/502,031 mailed Apr. 7, 2016.
Office Action for U.S. Appl. No. 13/762,299, dated Jul. 25, 2016.

* cited by examiner

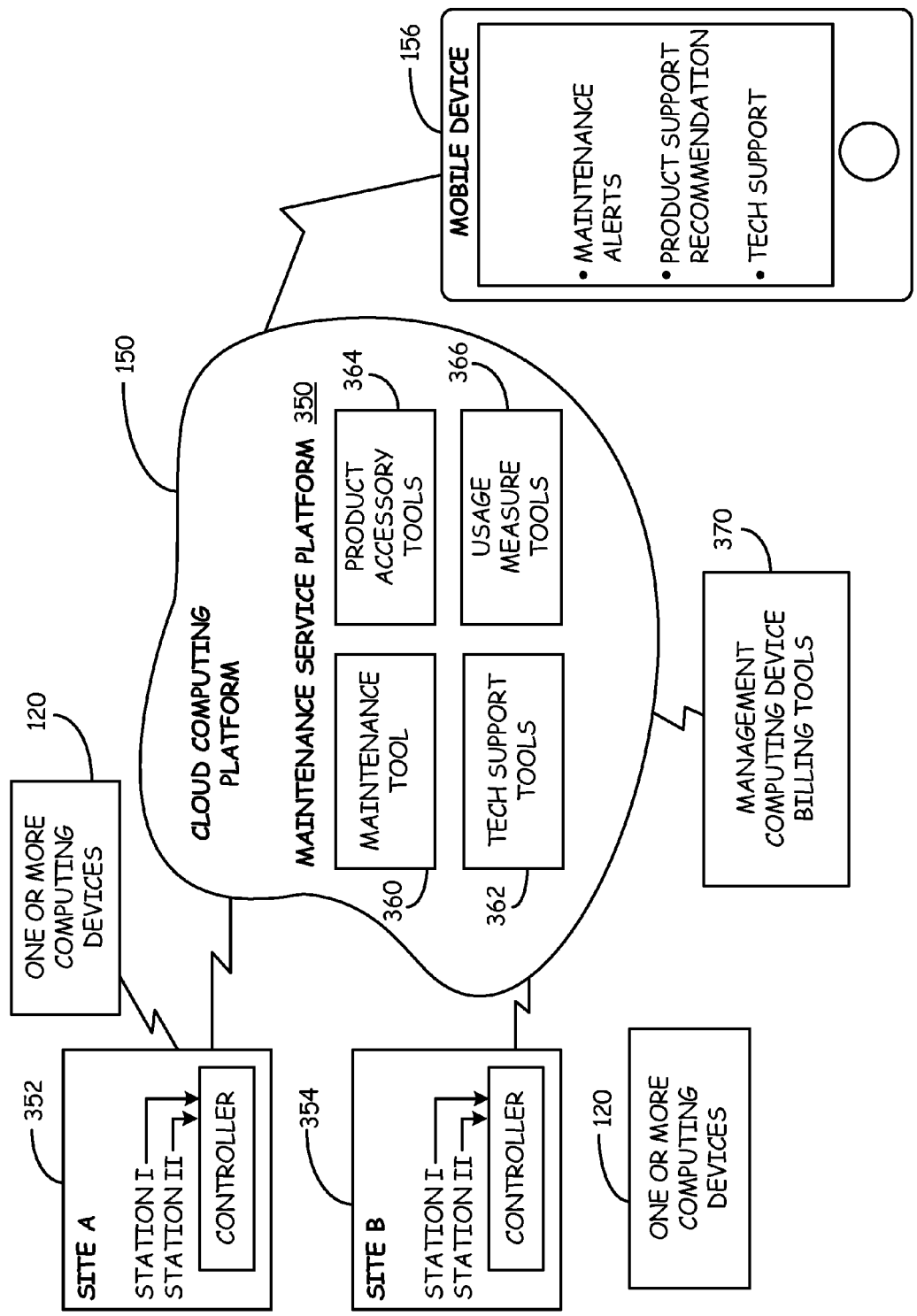

MOBILE APPLICATION TOOL AND GRAPHICAL USER INTERFACE

CROSS-REFERENCE TO RELATED APPLICATION

The present application is based on and claims the benefit of U.S. provisional patent application Ser. No. 61/596,144, filed Feb. 7, 2012, the content of which is hereby incorporated by reference in its entirety. Reference is made to U.S. application Ser. No. 13/762,299 entitled "A CLOUD COMPUTING PLATFORM FOR MANAGING DATA" and U.S. application Ser. No. 13/762,282 entitled "A MOBILE COMMUNICATION PLATFORM FOR TEST SYSTEMS APPLICATIONS" filed on even herewith, the contents of which are hereby incorporated by reference.

BACKGROUND

Test devices and power equipment are located in fixed locations in laboratories and test facilities. Thus, to monitor or oversee operation of the many test devices and equipment one must physically go to the fixed location in order to check the status. This limits the ability of personnel to monitor changes or detect problems before they become significant.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

The aspects described below are to various inventive features of a mobile application to provide remote access to data, and in particular test data as well as a method of operation regarding the same. These aspects need not be present on every system, or method but rather can be combined in any manner or used alone as desired. In embodiments disclosed, the mobile application tool includes a mobile test interface component configured to receive an access input associated with one or more testing devices and invoke an interface to a remote test platform to retrieve one or more testing device selections for the one or more testing devices associated with the access input. The tool includes a display function configured to receive the one or more testing device selections and invoke a graphical user interface to display the one or more test device selections and data associated with the one or more test device selections.

BRIEF DESCRIPTION OF THE DRAWINGS

FIG. 14 illustrates an embodiment of a cloud computing platform including maintenance, tech support, product/accessory and usage measurement tools.

DETAILED DESCRIPTION OF ILLUSTRATIVE EMBODIMENTS

Figure 1:
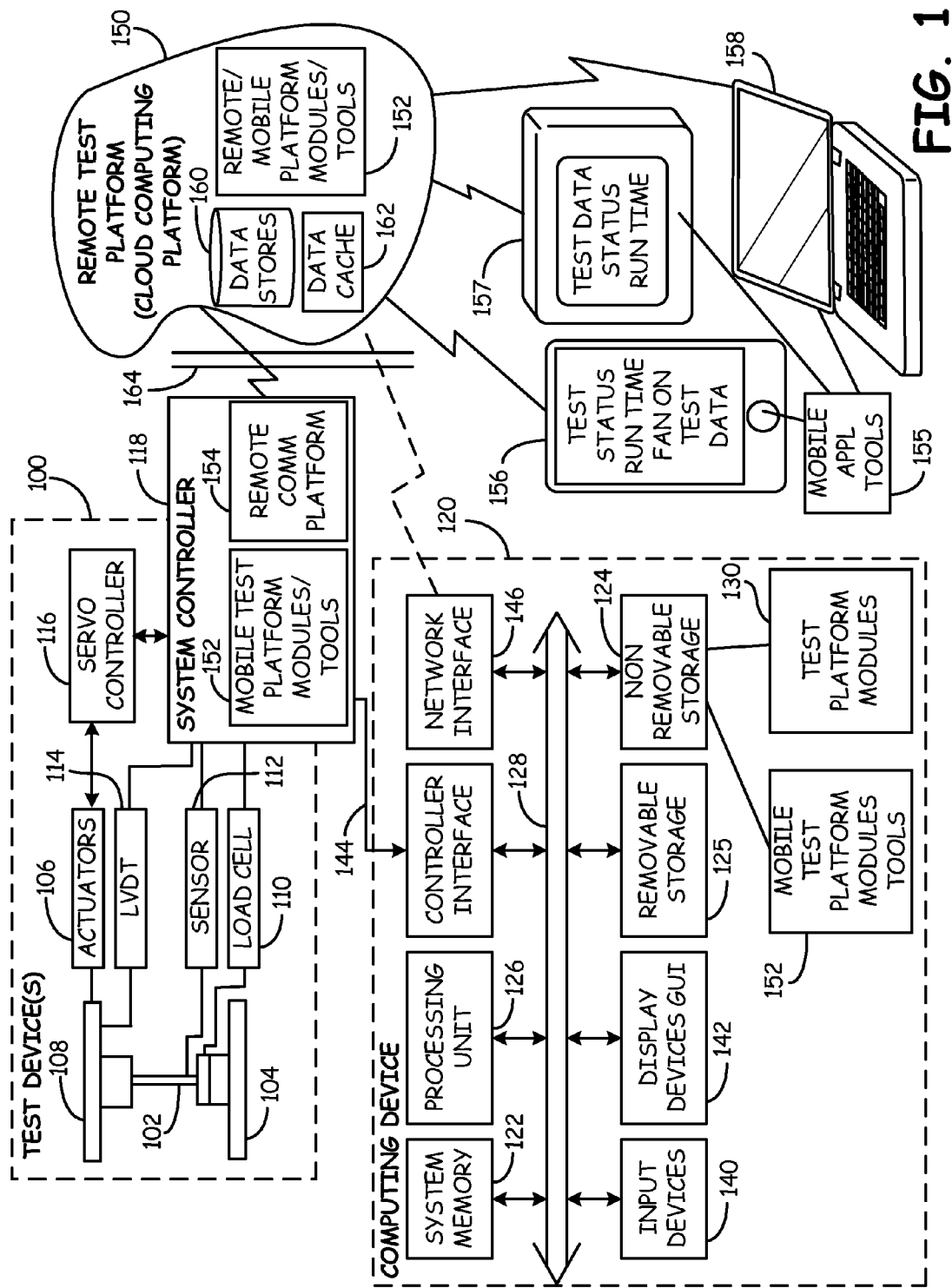
FIG. 1 illustrates an embodiment of a remote test platform for providing access to test data and status for a test device.

Test machines are used to test performance of consumer products, electronics materials, medical and other devices. FIG. 1 illustrates a test device or device 100 used to measure parameters or performance of a material specimen 102 secured to a frame 104 of the test device 100. The test device 100 shown includes an actuator 106, which is energized to apply loads to the specimen 102. In the embodiment shown, the load is applied to the test specimen through a movable cross-head 108 coupled to the frame 104 of the test device. The input force is measured by a load cell 110 positioned in the load path of the actuator 106. The test device 100 includes various sensors and transducer devices 112 to measure response to the load input. In the illustrated embodiment, a sensor 112 such as a strain gauge is coupled to the specimen to measure strain. The test device shown also includes a Linear Voltage transducer 114 to measure input displacement.

As shown, operation of the actuator 106 is controlled via a servo controller 116 via input from a system controller 118. The servo controller 116 and system controller 118 shown include various hardware and software components to implement control functions of the test device 100. Feedback from the sensor or load cell 110, 112 is provided to the system controller 118. As shown, the system controller 118 is coupled to a computer system 120, such a PC computing device including one or more hardware components. Connection of the test device 100 to the computer system 120 provides a program interface to define and set the control parameters for the test device 100. As shown, the computing device or PC 120 includes non-volatile system memory 122 and various non-removable data storage devices 124 and removable data storage media 125 operable coupled to a processing unit 126 through a bus structure 128. Illustrative storage media includes solid state memory devices, hard disc drives and other hardware devices Operating system and other application modules are stored in system memory 122. Various program modules are stored on non-volatile/non removable storage media 124. For example, the various programs stored on media 124 include a test platform 130 as well as mobile test platform modules or tools configured to implement various functions of the mobile test platform as described. Additional data and programs are stored on the various removable and/or non-removable storage devices. A user interfaces with the computing device 120 through input devices 140 and a display device 142 (schematically shown) to control operations of the test device 100. Illustrative input devices include one or more of a keyboard, touch screen, pointing device, microphone or mouse and illustrated display devices 142 include a monitor having a graphical user interface displayable on a display screen, such as a LCD screen. The computing device 120 interfaces with the system controller 118 of the test device through a controller interface 144. Illustratively, the controller interface 144 can be implemented through a USB port. The computer 120 is also connected to a wide area network or world wide web (Internet) through a network interface or modem 146 to access information through the Internet.

The test platform modules 130 include application programs that allow the user to input test parameters and specification through the graphic user interface on the display device 142. The test parameters define time, duration and force profile to be applied to the test specimen 102. Different load or test profiles can be applied depending upon different test criteria. For example, the test criteria can specify a static load for a specified duration followed by intermittent cyclical load. Based on the input test parameters the test platform modules 130 generates control parameters which are provided to the system controller 118 to provide control commands to the actuator 106 or other test system components. Output from the sensors 112, LVDT 114 or load cell 110 provides feedback to the system controller 118 or servo controller 116 to provide closed loop feedback control of the actuator 106 or test device. Output from the sensors 112, load cell 110 and other devices is also transferred to the computing device 120 and stored to one or more of the data storage media to store of test data for analysis and review.

In the embodiment shown, the test device 100 communicates with a remote test platform 150 implemented through a remote server or cloud computing platform to provide remote access to test data and operating status of the test device 100. The remote test platform 150 shown is implemented on computing device(s) similar to computing device 120 and includes remote platform modules or tool 152 operable on the computing device(s) to provide access to device data and operation status of test device 100 to one or more remote computing devices described below.

As shown, remote platform functions are implemented through mobile test platform modules and operating tools 152 on the computing devices 120 and/or system controller 118. The mobile test platform modules or tools 152 are configured to interface with control units or I/O signals from various device components including the actuator 106, LVDT 114, sensor 112 and load cell 110 shown in FIG. 1 to retrieve data which is transmitted to the remote platform 150 through a remote communication platform 154 to provide mobile or remote access to test device 100 and various types of data of the test device 100. As shown, test data, including data from the sensor, load cell, actuator and sensors is provided from the system controller 118 to the remote test platform 150 for access by remote or mobile computing devices, such as but not limited to mobile or cellular phones 156, tablets 157, laptop or portable computers 158 and remote desktop computers (not shown in FIG. 1), each of which can have functional elements similar to that of computing device 120. In the illustrated embodiment, the remote test platform 150 is external to a fire wall 164.

Data is transferred via the remote communication platform 154 to the remote test platform 150 through a communication interface or port of the controller (not shown) or computer device over a communication link. Illustratively the communication link is a cable or wireless communication link or combination of a cable and wireless communication link. Large amounts of test data and/or status events can be transmitted using a real time streaming protocol or long polling algorithms such as Comet algorithms or Websocket Protocol, for example to respond to data requests from mobile or remote computing devices to provide test data to the remote or mobile devices. As shown, data from test device 100 such as test data is stored to a data cache 160 or data store 162 of the remote test platform 150 at least temporarily or otherwise in a manner where it can be transmitted to one or more of the mobile or remote devices as shown in FIG. 1. In other words, data from test device 100 such as test data and/or status events (e.g. whether the test device 100 is performing the test or has stopped) can be transmitted through the remote test platform 150 to one or more of the mobile or remote devices 156 and rendered to the user thereof in real time. As used herein, "real time" means the data is rendered without intentional delay, given the processing limitations of the components of the overall system and the time required to accurately measure or otherwise ascertain the data. In the embodiment shown, remote communication platform 154 is part of the controller 118 but as will appreciated by those skilled in the art could be implemented as a separate unit or through the computing device 120. Moreover, it should be understood that the depiction, arrangement and/or description of all of the various modules, interfaces, components and the like herein are done so for the purposes of understanding the purpose or role of such elements and should not be considered limiting, but rather that such modules, interfaces, components and the like can be combined together or separated as desired. Illustratively the mobile test platform modules 152 implement various functions such as setting alerts, implementing maintenance functions, status updates and remote access to test data. As previously described, test data can be transmitted as a data stream to remote computing devices and decoded by a real time player or decoder. The decoded data is displayed on a GUI display 182 of the remote computing device. In one embodiment, the mobile test platform modules 152 include a summary algorithm to generate summary data from the i/o data or otherwise pertaining to the test device 100 for transmission to the remote test platform 150 and subsequently to a mobile or remote device. For example, mobile test platform modules 152 can include a computer based procedure to gather certain data stored in the system controller 118 and/or computing device 120 relevant to a problem occurring on the test device 100, summarizing such data and/or packaging such data, which is then provided to remote technical support personnel for diagnosing and/or servicing the problem.

In yet another embodiment, mobile test platform modules 152 can include a computer based procedure herein illustrated as a usage tool 366 (FIG. 14) to gather information related to usage of the test device 100 such as but not limited to amount of time the test device 100 was operating and/or performing a test, the number of cycles of the actuator(s) 106 overall, and/or related to the level of performance or usage that the test device was run at, for example, as measured with reference to the maximum capabilities of the test device 100 such as amount of time the device was operated above a certain level (e.g. based on full load capabilities of the actuator(s) such as overall time operated with the actuator(s) applying 25% or less of full load, overall time operated with the actuator(s) applying between 26% to 50% of full load, overall time operated with the actuator(s) applying 50% or more of full load; based on cyclical rate of the actuator(s) such as overall time operated with the actuator(s) cycling at less than 10% of maximum rate, overall time operated with the actuator(s) cycling at a rate between 11%-75% of maximum rate, overall time operated with the actuator(s) cycling at 76% or more of the maximum rate; and/or based on a level of hydraulic power needed to operate the test device 100 such as overall time operated requiring 10% or less of full load capabilities of the hydraulic power supply unit (not shown) powering the test device 100, overall time operated requiring between 11%-25% of full load capabilities of the hydraulic power supply unit, or overall time operated requiring more than 26% of full load capabilities of the hydraulic power supply unit, where the cited examples or not intended to be a complete list of each possible parameter, but rather merely examples).

It this point it should be noted that the foregoing examples of usage of the test device 100 can also serve as a basis for ascertaining the price to be paid by the user, at least in part. For example, any or all of the cited examples of usage or other parameters or measures indicative of usage can have an associated cost such as each percentage or range of percentages of usage has an associated cost, where higher demands placed on the test device 100 have a corresponding higher cost. Then, the total cost to the user for using the test device 100 or other associated equipment such as the hydraulic power supply unit, for example, for any desired time period can be calculated by adding together the costs for each individual time of usage, an invoice or the like can then be generated and reported to the owner of the equipment.

In yet a further embodiment, any or all of the foregoing measures or other measures of usage can be used by maintenance tool 360 to ascertain when service or maintenance is required for the test device 100. For example, any or all of the cited examples of usage or other parameters or measures indicative of usage can have an associated wear or damage unit such as each percentage or range of percentages of usage has an associated wear or damage unit, where higher demands placed on the test device 100 have a corresponding higher wear or damage unit. Then, maintenance can be based on when a certain amount of wear or damage units have been obtained, or other thresholds with respect to the measures of usage have been exceeded. The ability of the mobile test platform modules 152 on each test machine 100 in communication with the remote test platform 150 for delivery to a remote computer user communicating with the remote test platform 150 based on a schedule or based on request is particularly useful, advantageous and/or efficient. If desired, data indicative of usage and/or data indicative of wear or damage units together with information already known about the test station, test device or related equipment such as but not limited to age, model, and accessories, can be used by a tech support tool 362 and/or product/accessory support tool 364 (FIG. 14) to generate an estimate of the costs for an upgrade, or an estimate of the value of said equipment, which can be provided directly or indirectly via platform 150 to the test device user and/or one or more remote or mobile computing devices.

A user can interface with the remote computing devices through various input devices such as touch screen input devices or keyboards to remotely access test data and status information. Thus, as described, the mobile test platform provides the user with remote/real time access to the status of testing operations while away from or remote from the test device. In one application, the devices link to the data in the remote test platform 150 through an Internet URL address. The URL address includes address location of the remote test platform 150 and address information identifying the user and the specific test device. Thus, the remote test platform 150 processes the URL address to locate and transmit the specific test data or test information for the user's test device.

The mobile or remote computing devices use one or more mobile application tools 155 to access the remote test platform 150. Illustratively, the mobile application tools 155 include instruction and code to input URL or user or device identification to interface with the user's test station or devices 100. The mobile application tools 155 also include instructions to process test data from the data stream and generate the graphical user interface display on the mobile phone 156, tablet computing device 157, portable computing device 158 or other remote computing devices not shown in FIG. 1. The mobile application tools 155 can be downloaded from the remote test platform 150 and installed in the remote computing device. The test platform defines different data types, objects and GUI displays for different devices. The mobile phone, tablet or other computing devices use objects and code to display the test data and interface with the test platform to retrieve and request data.

In particular, the tools include a logon function to receive an access input such as a username and password or other access input such as a embedded code on a chip or bar or QR code. It should be noted that application of the embodiment illustrated in FIG. 1 is not limited to a test machine of the type illustrated in FIG. 1. For example in an alternate embodiment, data from a controller for an orthopedic test system can be transmitted to the remote test platform for remote access.

Figure 2:
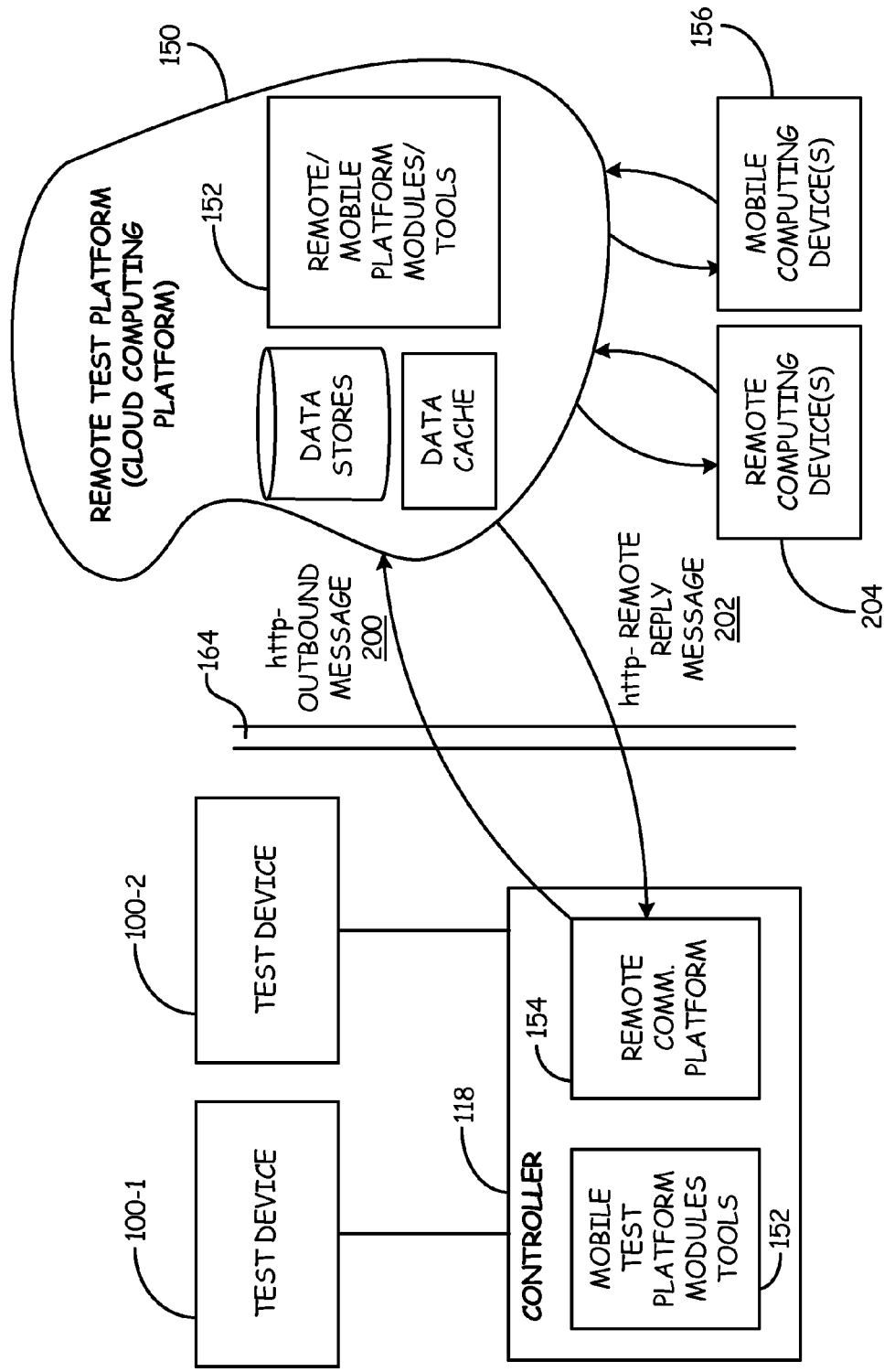
FIGS. 2-3 illustrate an embodiment of a communication sequence for interfacing with a remote test platform illustrated in FIG. 1.
Figure 3:
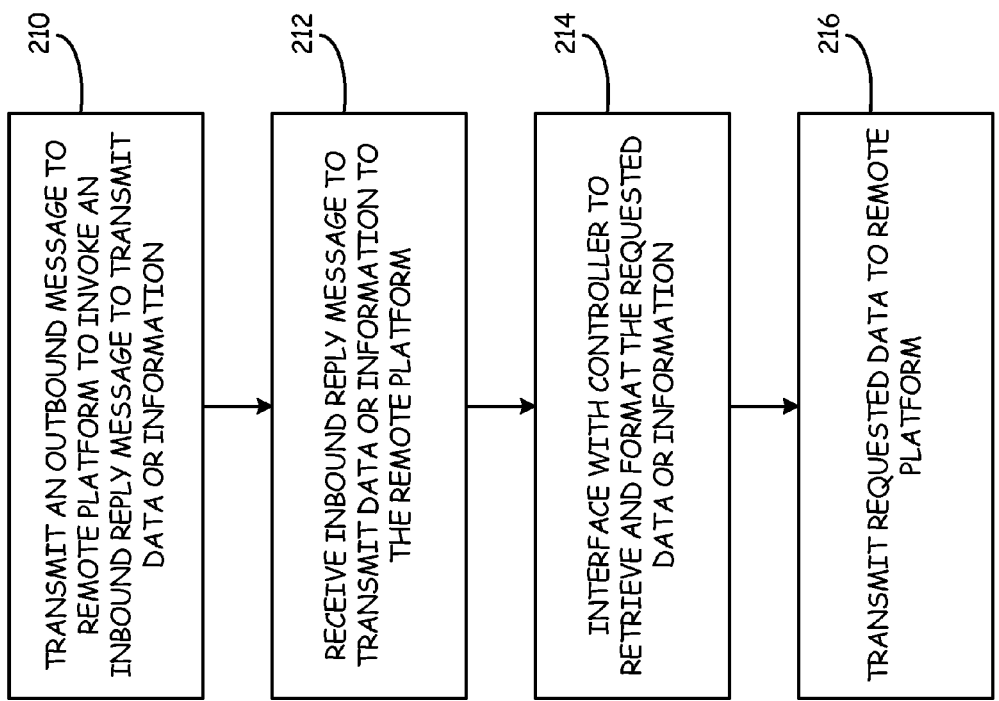

FIGS. 2-3 illustrate a communication sequence for interface between one or more test devices 100-1, 100-2 at a test facility separated from the remote test platform 150 by firewall 164 or electronic screening application. As shown in FIG. 2, the mobile communication platform 152 is programmed or configured to generate an outbound message to the remote test platform 150. The outbound message 200 may be generated based upon a system status change, such a test completion status, alert status or maintenance status. In response to the outbound message 200, the remote test platform 150 generates a message reply 202 to request test or other data. In response to the message reply, the remote communication platform 154 transmits the requested data such as status alerts, test data, maintenance data or other data. As shown in FIG. 2, in response to the outbound message 200, the remote test platform 150 determines if any remote or mobile computing devices are requesting data and or an alert is pending and if so (or requests first initiated by the mobile or remote device 156) generates the reply message 202 for the requested data. As indicated above such messaging can be performed using long polling or Websocket protocols. Data can be requested by the mobile or remote computing device to the remote test platform 150 through activation of a status alert or data request function inputted by a user through input devices of the computing device 120 or various remote computing devices 204.

FIG. 3 illustrates the communication sequence between the controller 118 or test device 100 and the remote test platform 150 as previously illustrated in FIG. 2. As shown in step 210, the communication platform 154 generates the outbound message 200 to the remote test platform 150 to invoke an inbound reply message 202 (albeit possibly delayed in time) for data from the remote test platform 150. The inbound or outbound messages can include a requested data type for transmission. In step 212, the communication platform 154 receives the inbound reply message 202. In response to the inbound reply message 202, the remote communication platform 154 interfaces with controller 118 to retrieve and format test data or information from the controller 118 using if needed mobile test platform modules 152 as exemplified above. In step 216, the communication platform 150 transmits the data to the remote test platform 150. The outbound message 200 can be generated based upon a change in test status or in response to an alert implemented via mobile platform modules 152 in response to user input, or otherwise sent repeatedly waiting for a remote or mobile computer user to inquire upon its status or current location in a test performed on a test specimen. In response to the outbound message 202, the remote test platform 150 can poll or otherwise wait for a request from the remote or mobile computing devices to determine if a data request or alert is pending and generates the reply message 202 to request data to respond to the data request or alert for particular test device(s) at a particular test facility. Illustrative data includes run state, interlock state, signal values and station logs, hydraulic power unit on/off status, and low/high status, test status, test running time, cycles completed, force data, displacement data, maintenance alerts, failure data, commanded force and/or displacement data, a test run/hold/stop status or other data. The requests made upon the test device 100 can come from and be provided to one or more mobile devices 156, where requests made upon the test device 100 can be different for each mobile device user. The remote test platform 150 can maintain user account information for each user that accesses the remote test platform indicating which test device 100 or collection of test devices 100 the user has authority to access as well as information pertaining to what authorized requests can be made upon each or a collection of test devices 100.

In one embodiment, the remote test platform 150 maintains a queue for each test device 100 connected thereto containing all requests made to the test device 100 from one or more users of the mobile or remote devices 156. The requests can be embodied in the remote reply messages 202 in first-in-first-out basis, or based on some priority if desired. It should be noted that the requests made to the test device 100 and the responses therefrom need not be limited to inquiring as to the status, obtaining real time test data, or summary of information as described above, but could also take the form of communications between the mobile device user(s) having access to the test device and/or the operator of the test device 100. Such communications can be text messages, image messages, audio and/or video clips rendered to each of the users using the GUI and necessary hardware (e.g. monitor and/or speakers) depending upon the hardware and processing capabilities of the mobile computing device 156, the remote test platform 150 and the remote communications platform 154. Communication provided through the remote test platform 150 when the user of the test device 100 and/or the users having access to the test device 100 is particularly efficient since one or both users (which can also include communications just between users of mobile devices 156) attention is focused on performance or use of the test device 100. Likewise, in situations when such users may not be at the test device 100 or a remote user is not connected to receive data from the test device 100, messages can be stored, for example, at the remote test platform 150 and provided to the user at the test device 100 or when connection is made with a remote or mobile device 156. Again, this is particularly efficient since notification and/or delivery of the stored communication is provided when the user's attention is now focused on the test device 100. The GUI can initiate capture or recording of each of the various types of communications with selection of a corresponding button or the like by the user on the GUI.

Figure 4:
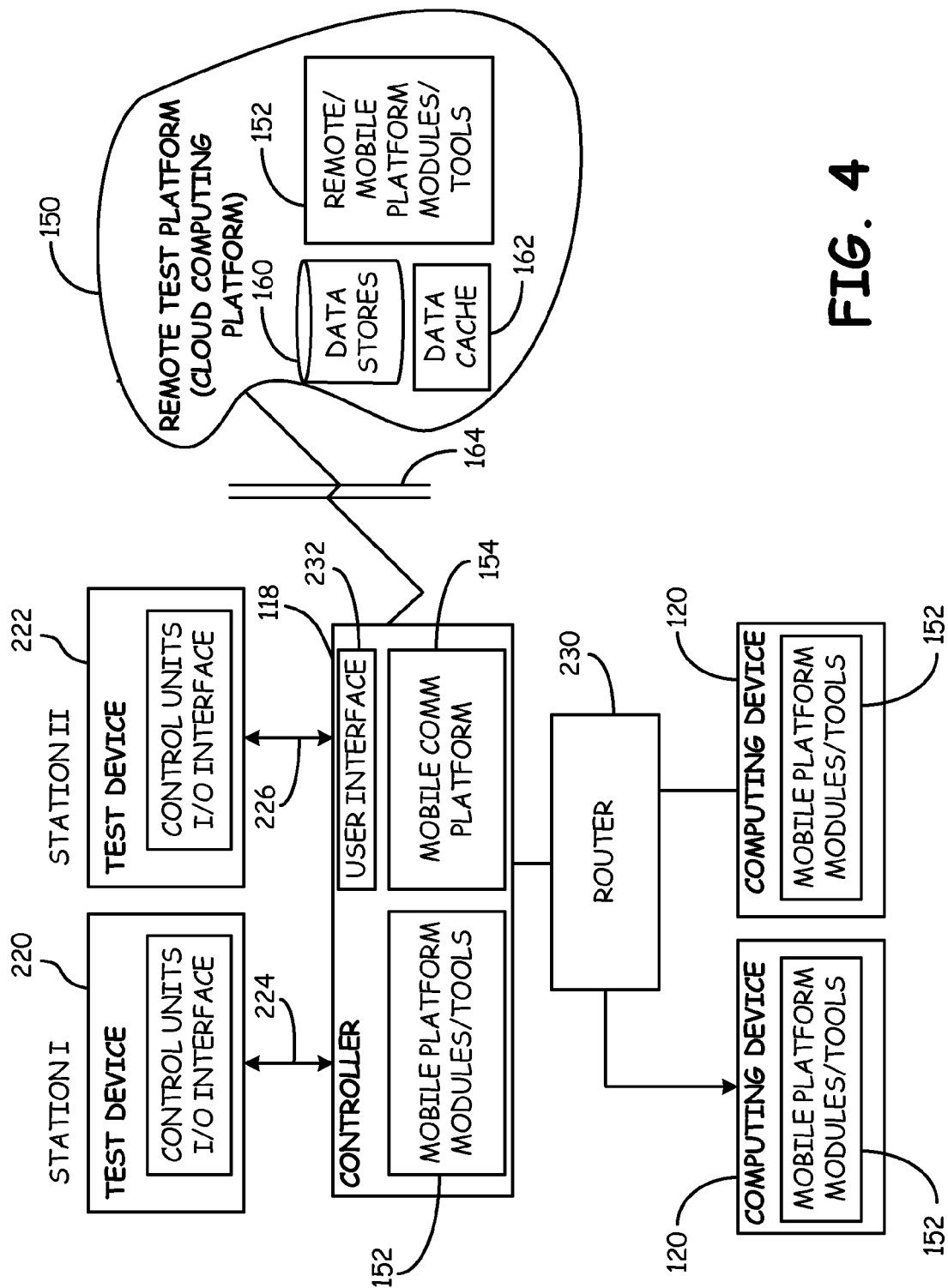
FIG. 4 illustrates an embodiment of a remote test platform for providing access to test data and status for a plurality of test devices in a laboratory facility.

FIG. 4 illustrates a test application for a test facility having a plurality of test devices at a plurality of test stations 220. In the illustrated embodiment the controller 118 communicates with the test devices of a plurality of test stations 220, 222 through one or more communication channels 224, 226 connected to each test station (only one shown in FIG. 4). The controller 118 transmits input commands and output over the one or more communication channels to interface with one or more control units of the testing device such as sensor, actuator, load cell and LVDT (not shown in FIG. 4). Illustrative input/output includes commanded force or displacement and feedback force or displacement. The controller receives i/o data from the control units and provides the data to the mobile communication platform 154 through the communication channels 224, 226 for transmission to the remote test platform 150. As shown, PC computers 120 for operating each of the test stations 220, 222 can be connected to the controller 118 through a router 230 or connected directly to the controller through, for example, a USB port connection or direct ethernet connection. In the illustrated embodiment, the controller 118 includes a user interface to activate various functions of the mobile test platform.

Figure 5:
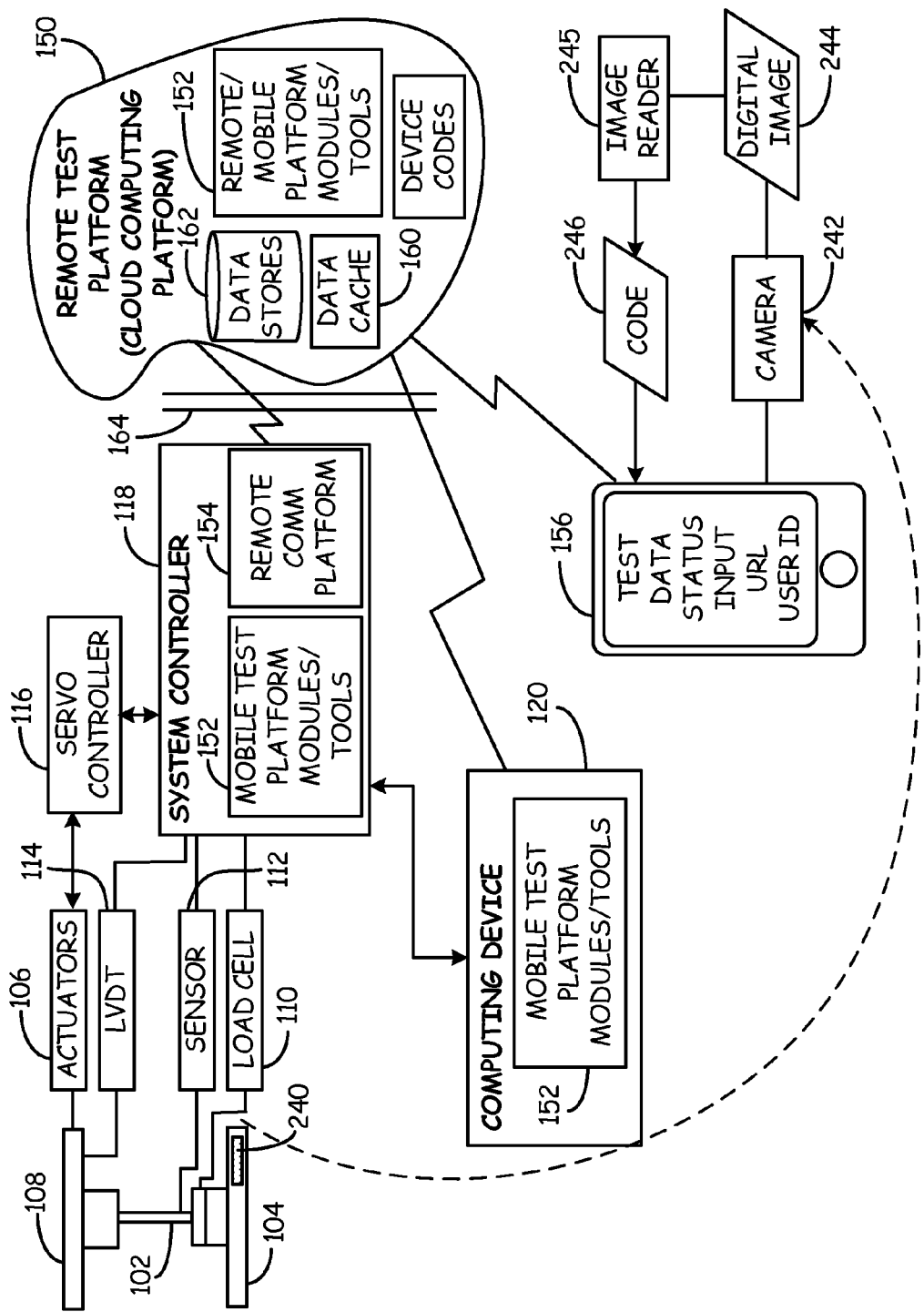
FIGS. 5-6 illustrate embodiments of a remote test platform utilizing image or bar codes to identify testing devices or components to access status information and data therefor.

FIG. 5 illustrates another embodiment of a test device implementing a mobile communication platform as previously described. In the embodiment the testing apparatus or device has an ID code 200 (identification) to distinguish multiple test devices and the data therefor. The ID code is associated with an image such as a bar or QR code 202, which is affixed to the test device 100. The pattern of the image or bar code is stored in memory of the system controller 118 or computing device 120 shown and the remote test platform 150. Test data from the device is stored in the cache or data store 160, 162 of the remote test platform utilizing the ID code 200. As shown, the mobile device (or other remote computing device—not shown) equipped with a camera 240 is used to access data utilizing image or bar code 202 affixed to the test device 100. The camera 242 captures an optical image 244 of the bar code 240 and provides a digital image of the bar code to a reader application 245. The digital image is processed by the reader application 245 to provide an alphanumeric URL code 240 or the like which is used to access information or data for the test device 100 from the remote test platform 150. In alternate embodiments, near field communication tools are used to provide the code. In such embodiments the mobile or remote computing device uses a radio to retrieve an embedded code on a chip (NFC chip or tag) when the radio is held closely to the chip. The code is then used an the access input to access information or data for the test device through the remote or mobile computing device.

Figure 6:
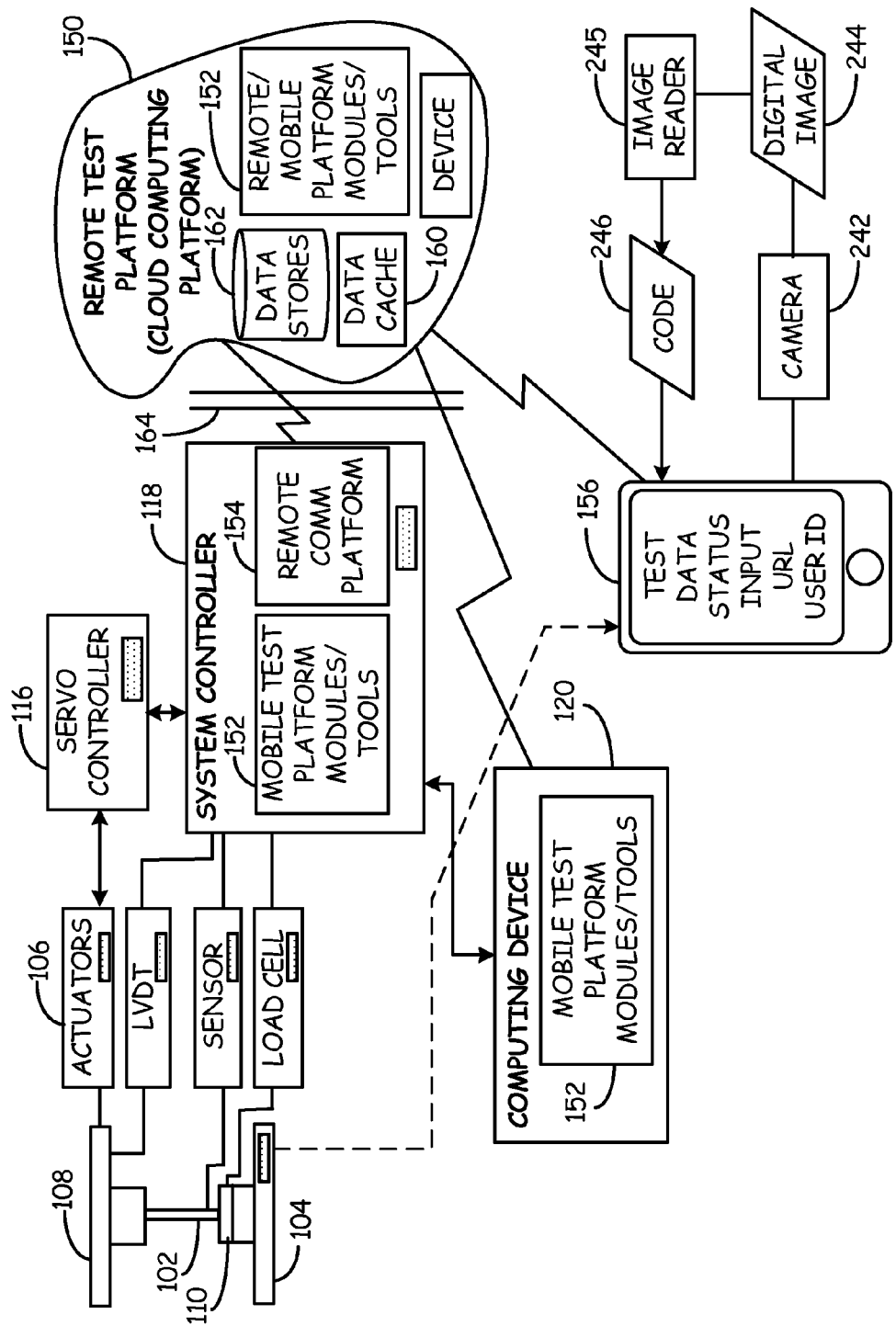

In the embodiment illustrated in FIG. 6, each of the components of the test device 100, including sensor, actuator, LVDT, and load cell and controller components include identification codes. In the embodiment shown, components of the test machine are identified by separate identification or image codes. In particular as shown, the actuator, load cell, LVDT, frame and various sensors include codes to access specific data for each of the components separately. The specific data can be used to perform maintenance checks as previously described or retrieve technical data. The image or bar codes on the actuator 106, load cell 110, LVDT 114 and sensor 112 provides a component ID or URL separate from the device 100. Data transmitted includes an associated device ID or component ID to distinguish the source of the data. A user can access test or maintenance data for the device or any component of the device 100 using the image or bar codes as previously described with respect to FIG. 5.

Figure 7:
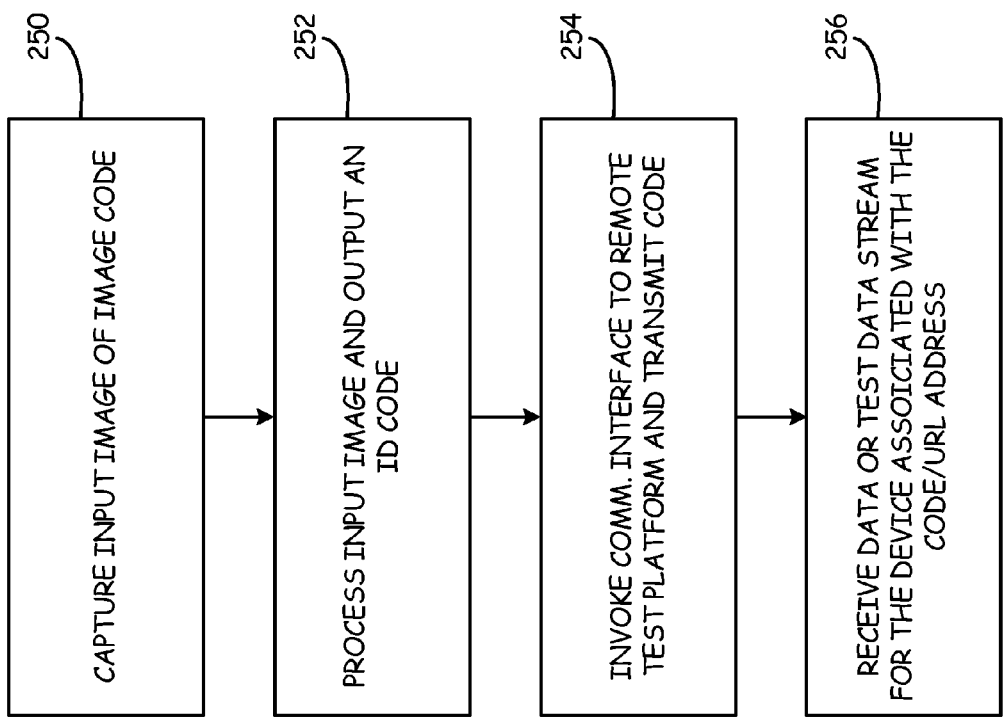
FIG. 7 illustrates steps for utilizing an image or bar code as illustrated in FIGS. 5-6.

FIG. 7 illustrates method steps for accessing the test data on the remote test platform 150 through a mobile or remote device using the camera 242 on the mobile device and image or Q/R code (e.g. matrix bar code) affixed to the device 100. As illustrated in step 250, an input image of the bar code is captured via the camera 242 to generate a digital image 244 of the bar code. The digital image is processed by a bar code reader 245 as illustrated by step 252 to provide the device ID or code. In step 254 an interface to the remote test platform is invoked to transmit the code and mobile device address. As illustrated by step 256, the mobile or remote device receives data feeds or alerts for the test device corresponding to the device code or URL address.

Figure 8:
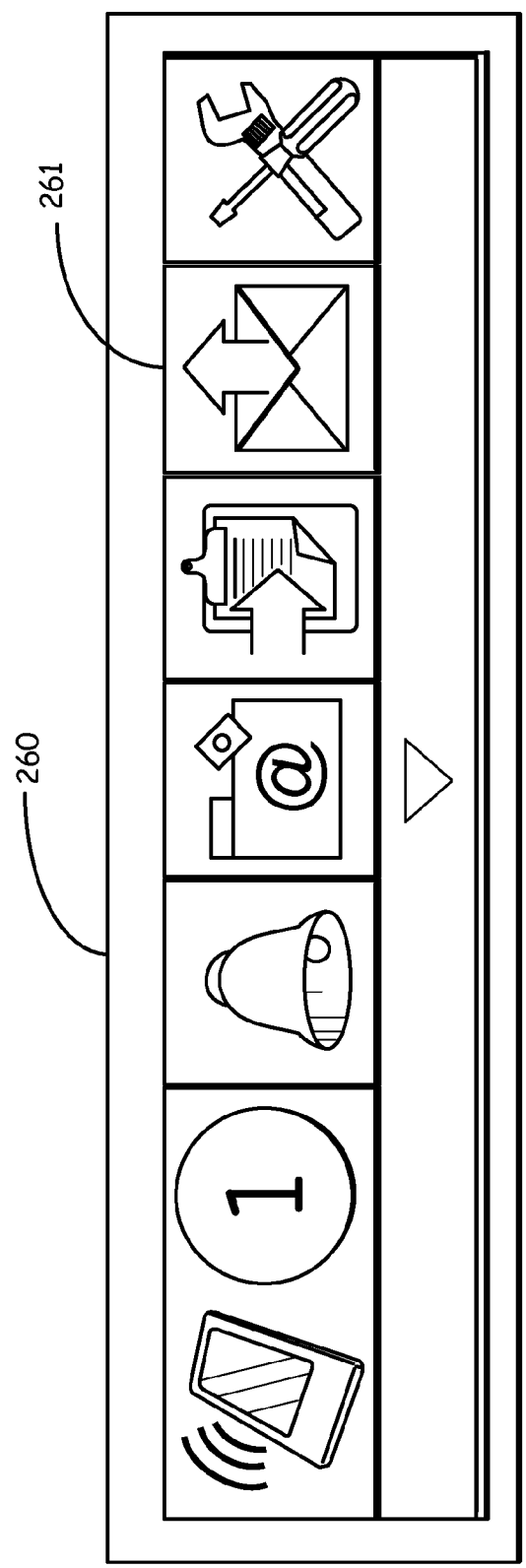
FIG. 8 illustrates a display bar for implementing functions of the mobile test platform.

FIG. 8 illustrates an embodiment of a GUI display bar 260 which can be displayed through the display device 142 of the computing device 120 or through a display device of the system controller (not shown). The GUI display bar 260 is implemented through the test platform modules or tools 152 on the computing device 120 or system controller 118. As shown the GUI display bar 260 allows the user to enable/disable alerts, send the URL for the test lab or facility to remote computing devices using e-mail or text messaging and change or set equipment states for the test device(s). In particular selection of message icon 261 allows the user to e-mail or text message a link through the PC computing device 120 in the lab to the user's remote computing device. Selection of the link retrieves data and information for the test devices to provide a GUI display as shown in FIGS. 9-11 on the user's remote computing device.

Figure 9:
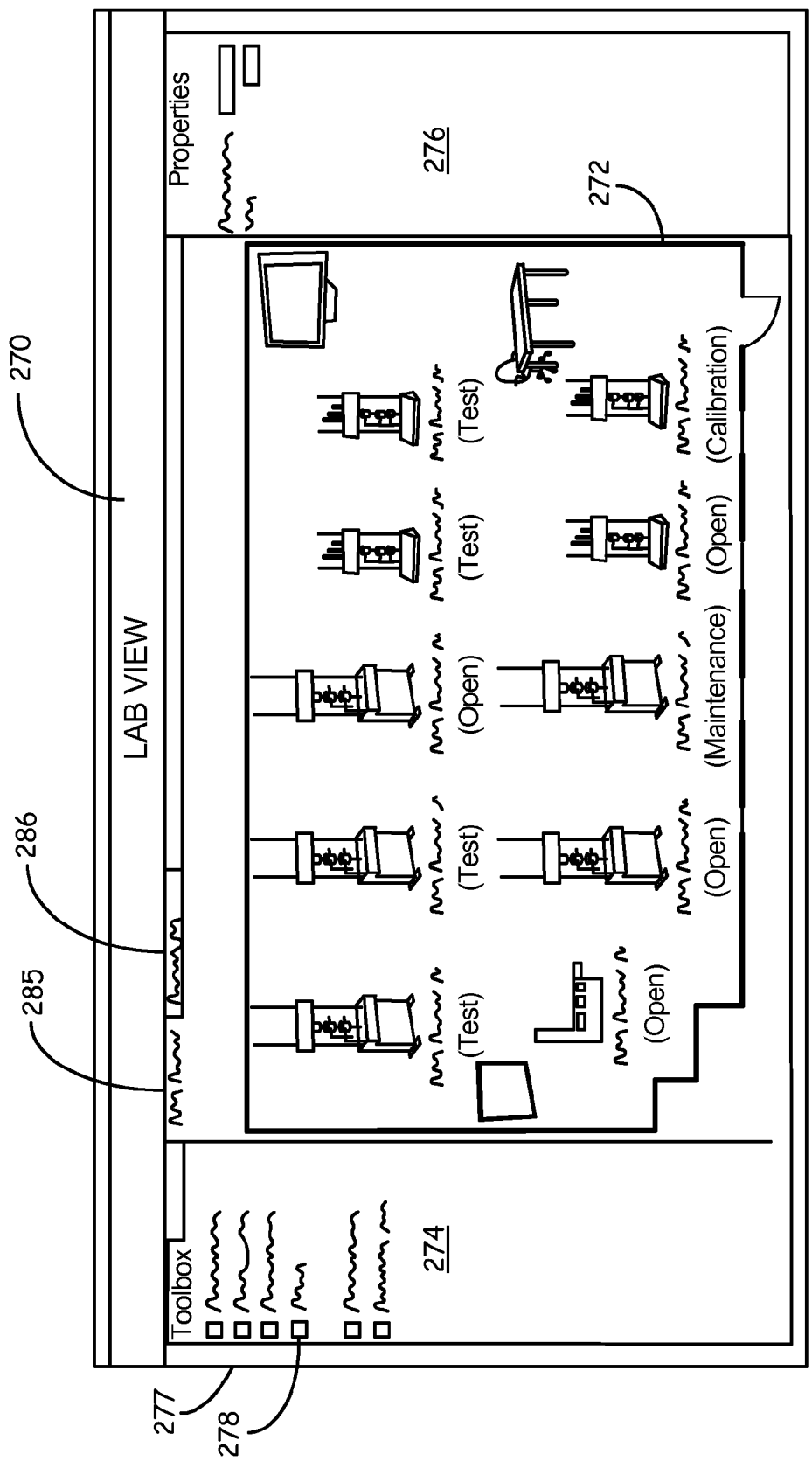
FIGS. 9-11 illustrate GUI displays for a computing device configured to interface with the remote test platform to access test data and status.
Figure 10:
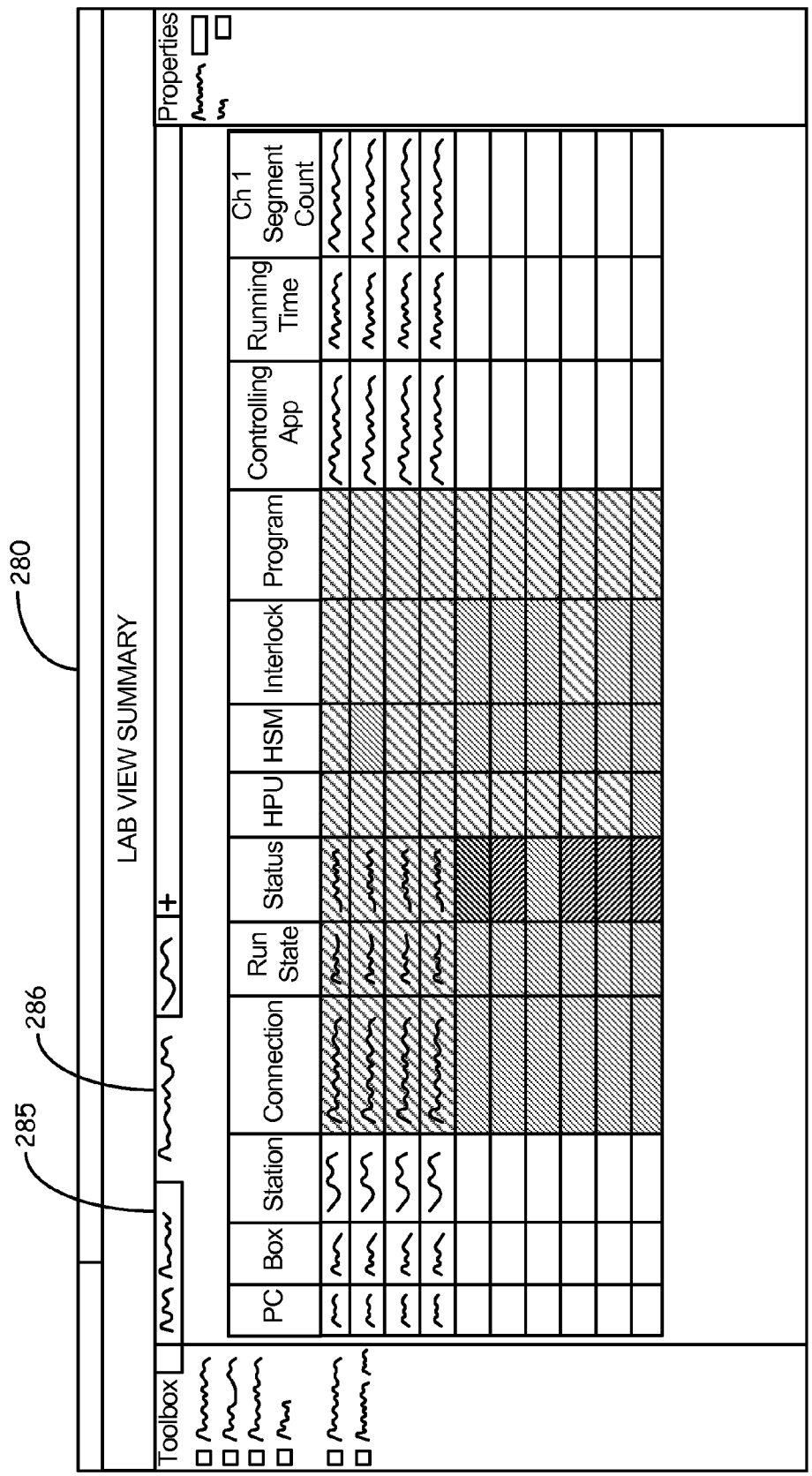
Figure 11:
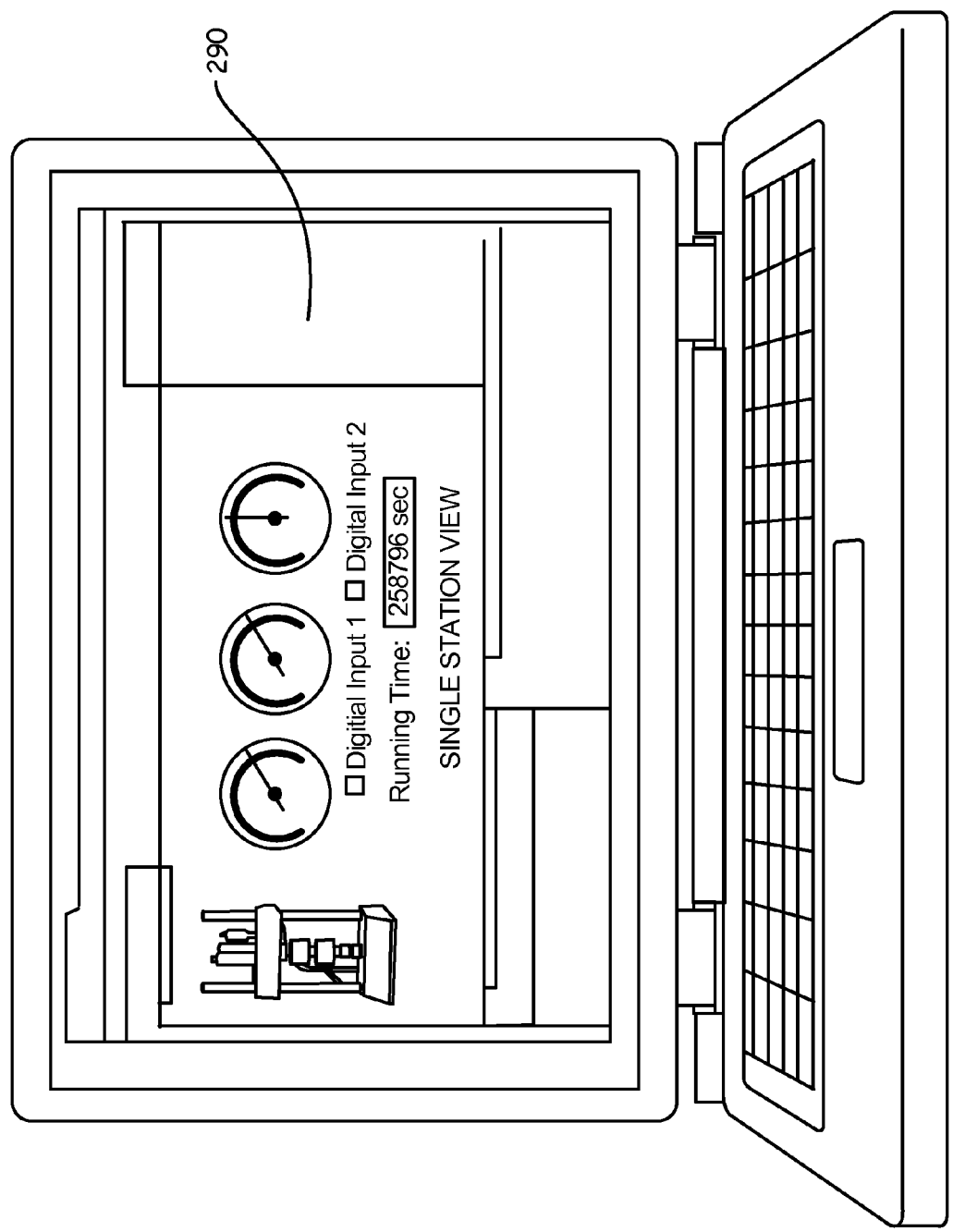
Figure 12:
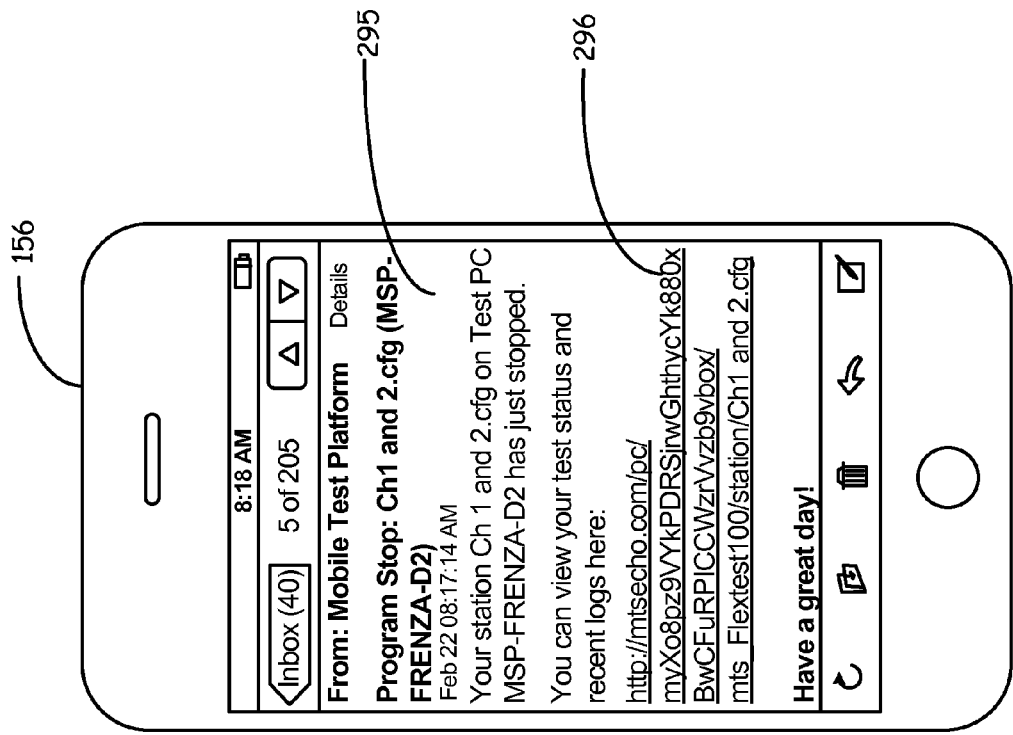
FIG. 12 illustrates an alert notification generated by an alert function of the mobile test platform.

FIGS. 9-11 illustrate various GUI displays for remote computing devices 204 to provide access to test data and status. As previously described, the remote test platform or system can be utilized to provide data to remote computing devices such as desk top computer, portable computers or tablets. To provide remote access, the computer or tablet includes the mobile application tools 155 and modules to access test data, status information and activate alerts. The tools or modules on the computer or tablet are configured to generate various GUI to interface with the mobile or remote test platform 150. The GUI 270 illustrated in FIG. 12 illustrates a lab view display to recreate the layout of a test lab or facility 272 including a plurality of test devices or stations 100. Such a GUI being representative of the physical locations or general layout of the test devices in the test lab or facility 272 is particularly useful since the user of such a display can more readily and/or accurately identify a desired test device to which requests will be made because the position and/or relationship of icons for the test devices 100 on the GUI corresponds to that of the test facility 270. As shown the GUI 270 includes menu portion 272 and a display portion 276. The menu portion 274 includes a menu of test devices or equipment selections 276 in addition to non-test device icons such as lab and furniture selections 278. The ability to include non-test device icons/elements in the GUI further aids the user in readily and accurately identifying the correct test device icon for the desired test device to which requests are made. As shown, the lab and furniture selections 278 include desk icons, chair however, application is not limited to particular furniture articles but can include structural elements of the lab facility such as walls (exterior and/or interior), partitions and the like as well as elements therein such as windows, doors or other openings.

To interface with the GUI 270 shown, an input or pointing device is used to select and position the test device and, if desired, non-test device icons (e.g. furniture) selections 277, 278 on the display portion 276 to recreate the actual arrangement or layout of the lab 272. Thus, user can arrange the display portion 276 to match the arrangement of the test stations in the lab so that the user has a quick reference to various testing devices 100 based upon location in the physical laboratory or facility. In the illustrated embodiment, the test device selections 277 include test stations or device icons corresponding to actual representations in the lab. The icons or selections for the test station are generated based device information for the test stations transmitted from the remote test platform 150 to the GUI 270 utilizing URL or other identifications for the one or more test devices or facilities.

As appreciated by those skilled in the art the user or lab identification can be transmitted through a URL address or the user or lab identification can be inputted in response to an input prompt as well as through bar codes as previously described. FIG. 10 illustrates a lab view summary 280 of each of testing devices for one or more testing stations. As shown, the lab view summary 280 provides the computing device for each testing device, communication channels or station, run time and other information. A user can toggle between the lab overview 270 and lab summary 280 via input selections 285, 286. FIG. 11 illustrates a GUI for a single station view 290 for a particular test device. As shown, the single station view provides more detail data including command and feedback data. The single station view 290 is generated using a drill down function upon selection of a single test device icon or selection. Data for the single test device is retrieved from the remote test platform 150 in response to activation of the drill down function using for example using communication protocols previously described.

FIG. 12 illustrates an alert notification implemented through an alert function of the mobile test platform tools 152. In the illustrated embodiment, the alert function is a test complete function alert. As shown, implementation of the alert/notification function generates the outbound message 200 to the remote test platform 150. In response to the message 200, the remote test platform 150 generates the reply message 202 to request the alert/notification. Alternatively, the test platform may send a notification to the remote test platform whenever a significant event occurs. The remote test platform will determine if any mobile device or user wants to be alerted of this event. If so then the remote test platform 150 alerts the mobile or remote computing device through appropriate methods. As previously described, in response to the reply message 202 the notification data is transmitted through the remote test platform to the mobile device. As shown the alert/notification display 295 includes a notification that the test run for Station I is complete and includes a link 296 to view a data log for the test data store in the remote test platform 150.

In illustrated embodiments, the test platform can send a message 200 to the remote test platform 150 requesting which things it should watch and tell the remote test platform about when they happen. The test platform can then monitor these things (e.g. such as a limit on a signal) and will send a message to the remote test platform 150 when that specific trigger occurs. The remote test platform 150 can then act accordingly and alert remote devices or users that the trigger has occurred. This method is helpful when alerts are requested faster than the test platform can send them to the remote test platform 150, or to reduce bandwidth so the test platform 150 can make the decision of when the alert occurs instead of delaying the decision until the remote test platform gets the information.

Figure 13:
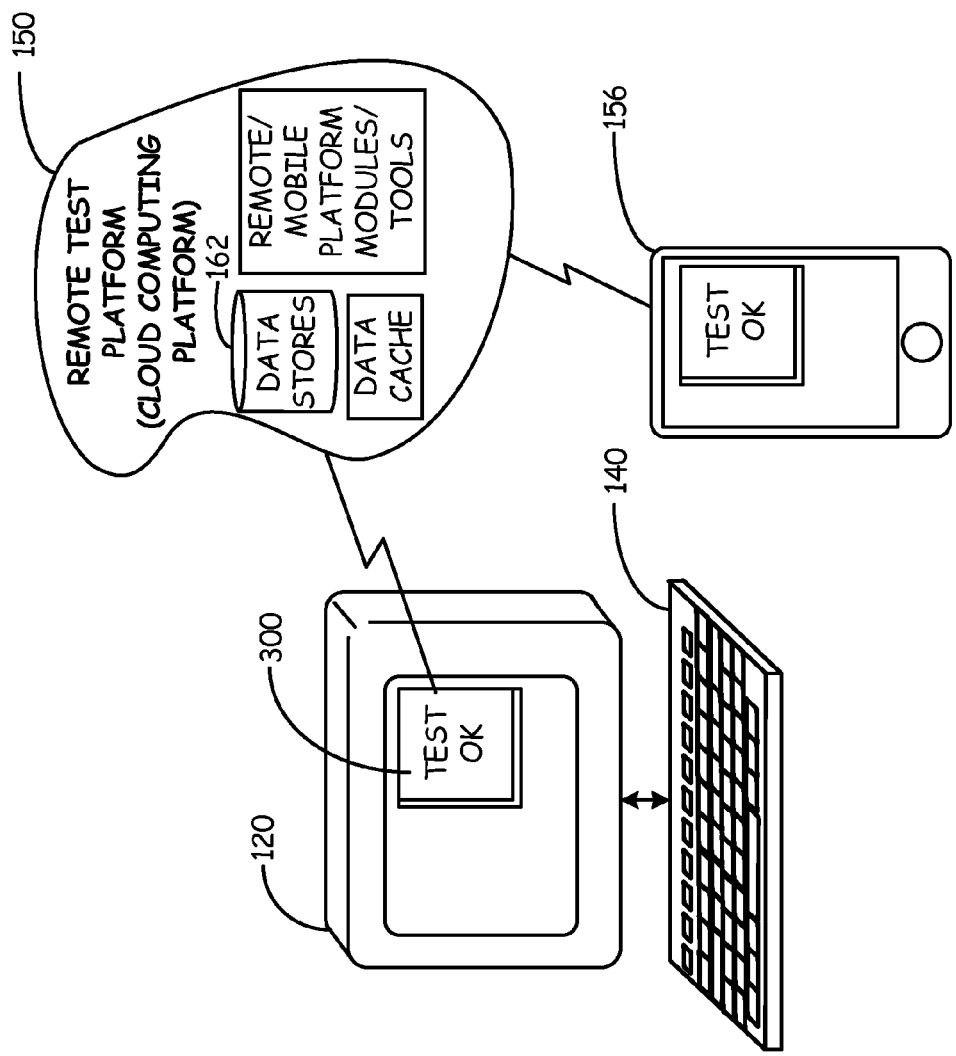
FIG. 13 illustrates an embodiment of a messaging function of the mobile test platform

FIG. 13 illustrates an exemplary messaging function implemented through mobile test platform modules and tools 152 as previously described. As shown, a user at the test station can enter a message post 300 though a sticky note via input devices of the computing device 120. In response to the input message post 300, the communication platform 154 transmits the message to the mobile or remote computing device utilizing communication protocols previously described.

FIG. 14 illustrates a cloud based maintenance or service platform 350. In the illustrated embodiment, the platform is used to monitor and/or service multiple stations at sites A and B 352, 354. As shown and mentioned above, the platform 350 includes the maintenance tool 360, tech support tool 362, product/accessory support tool 364 and usage measurement tools 366. The tools are configured to interface with powered devices, such a hydraulic actuators or other power devices at sites A and B via communication protocols as previously described. The maintenance tool 360 uses maintenance data from controller units or devices of site A or Site B to issue maintenance alerts and schedule maintenance procedures. Maintenance data can be calculated based upon damage unit calculations using hours of use to calculate the maintenance status as, cycle counts, the amount of force applied over a time period with higher forces accounting for example previously described more damage units than smaller forces.

The tech support tool 362 utilizes technical information for station devices to provide technical support to users through remote computing device 204 or mobile devices. The type and model of the devices are identified based upon associated device and station codes. The product support tools 364 provide product or accessory suggestion for users of station or test devices through the GUI at the test device 100 and/or the mobile and remote devices 156. For example, tech support tool 362 generate a message and sent to the remote test platform 150, which is then subsequently rendered by the station device, test device and/or mobile device 156 having a known association with the testing device 100. The corresponding GUI can generate a button, link, icon or other form of user selectable feature to obtain further information related to the message. For example, activation of the user selectable feature can directly or indirectly (through the remote test platform 150) transmitted to the tech support tool 362. The tech support tool 252 can then transmit further information concerning the possible accessory (such as connecting the user to an online catalog or personnel equipped to take the order and/or answer questions), product update information, information concerning maintenance just to name a few type of further information. Usage tools 366 can automatically interface with the necessary controllers to retrieve usage parameters related to the current state of the test device or test station, such as but not limited to use time or cycles for the device if such current state information is needed by the tech support tool 362. Information from the tools 360, 362, 364, 366 can be broadcasted to remote computing device (not shown) or mobile device as previously described. As shown, information from the tools is also transmitted or broadcasted to a management device 370 for central control. Management device 370 can be a desk top computer or server. Maintenance information provided to the management device is used to monitor and schedule maintenance for station devices. Usage information provided to the management device 370 can be used to monitor service agreement and determine billing amounts for a service contract based upon usage.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A mobile application tool including instructions stored on a computer storage medium and operable through one or more hardware components of a computing device:
    a mobile test interface component configured to receive an access input associated with one or more testing devices and invoke an interface to a remote test platform to retrieve one or more testing device selections for the one or more testing devices associated with the access input;
    a display component configured to receive the one or more testing device selections and invoke a graphical user interface to display the one or more test device selections, the graphical user interface including:
        a test facility template including a test facility display area, the test facility template representing a physical location at a test facility having one or more testing devices; and
        a menu of one or more testing device selections representative of the one or more testing devices, the one or more testing device selections selectively locatable within the test facility display area via a positioning function through an input device operable with the graphical user interface; and
    an alert function configured to provide notification of a completion of a test cycle or run and a link to retrieve test data from the remote test platform for the one or more testing devices.

2. The mobile application tool of claim 1 wherein the access input is one of a username, password or an input code associated with the one or more testing devices.

3. The mobile application tool of claim 2 wherein access input is an input code and the mobile test interface component is configured to invoke to an image code reader to scan an input image code or label on the one or more testing devices and invoke the interface to the remote test platform to retrieve the one or more testing device selections associated with the input image code.

4. The mobile application tool of claim 3 wherein the image code reader is a QR code reader configured to scan a QR code on the one or more testing devices and the mobile test interface component invokes the interface to the remote test platform to retrieve the one or more testing device selections corresponding to the input QR code.

5. The mobile application tool of claim 1 wherein the one or more testing device selections comprise an icon including a pictorial representation of a model of the testing device associated with the one or more testing device selections.

6. The mobile application tool of claim 1 wherein the one or more testing device selections includes a plurality of testing device icons populated from the interface to a data store of the remote test platform.

7. The mobile application tool of claim 1 wherein the remote test platform is implemented through a cloud computing platform.

8. The mobile application tool of claim 1 wherein selection of one of the one or more testing device selections invokes an interface to the remote test platform to retrieve test data for the test device associated with the selected testing device selection.

9. The mobile application tool of claim 1 wherein the tool includes an alert function which when activated invokes an interface with the remote test platform to receive alert notifications for the one or more testing devices.

10. A graphical user interface platform including instructions stored on a data store media and executable through one or more hardware components comprising:
a graphical user interface including:
a test facility template including a test facility display area, the test facility template representing a physical location at a test facility having one or more testing devices; and
a menu of one or more testing device selections representative of the one or more testing devices for the test facility and one or more non-testing device selections for the test facility, the one or more testing device selections and the one or more non-testing device selections selectively locatable within the test facility display area via a positioning function through an input device operable with the graphical user interface.

11. The graphical user interface platform of claim 10 and comprising:
a menu population component configured to invoke an interface to a remote test platform to retrieve one or more test device selections associated with an identification code corresponding to a laboratory or testing facility to populate the menu of the GUI with the one or more testing device selections.

12. The graphical user interface platform of claim 10 wherein the one or more testing device selections include pictorial icons representing the one or more testing devices.

13. The graphical user interface platform of claim 10 wherein the platform uses an input code decoded from an optical image reader to retrieve the one or more testing device selections to populate the menu.

14. The graphical user interface platform of claim 10 wherein the graphical user interface renders messages transmitted from the remote test platform.

15. The graphical user interface platform of claim 14 wherein the graphical user interface platform invokes an interface to the remote test platform to retrieve test data or information responsive to selection of the one or more test device selections.

16. The graphical user interface platform of claim 15 wherein test data or information includes one or more of a run state, interlock state, a test run/hold/stop status, cycle count, running time, and commanded/output force or displacement, and station logs.

17. The graphical user interface platform of claim 10 wherein the graphical user interface platform includes a lab view display including a plurality of test device icons and a facility summary display for one or more test devices in table form.

18. A method comprising:
transmitting a data request to a remote test platform operable with one or more testing devices at a test facility;
receiving one or more test device selections, the test device selections being representative of the one or more testing devices;
receiving an input selection from a menu of the one or more test device selections and an input position on a facility or lab display template representative of the one or more testing devices at the test facility;
invoking an instance of the selected test device selections and displaying the instance of the selected test device selection at the input position on the facility or lab display template;
interfacing with the remote test platform to receive test data in response to selection of the one or more test device selections;
receiving an input selection of one or more non-testing device selections and an associated input position on the facility or lab display template; and
invoking an instance of the selected non-testing device selections and displaying the instance of the non-testing device selections at the associated input position on the facility or lab display template.

19. The method of claim 18 and comprising
receiving an input image code corresponding to a test machine or test laboratory;
decoding the input image code to provide a decoded identification code; and
using the decoded identification code to retrieve the one or more test device selections.

* * * * *